(12) United States Patent
Furrer (10) Patent No.: US 7,653,578 B2
(45) Date of Patent: Jan. 26, 2010

(54) PORTFOLIO ACCOUNTING SYSTEM AND METHOD FOR HANDLING UNCERTAINTY IN ACCOUNTING INFORMATION

(76) Inventor: Thomas Furrer, Kirchbodenstrasse 73A, CH-8800 Thalwil (CH)

( * ) Notice: Subject to any disclaimer, the term of this patent is extended or adjusted under 35 U.S.C. 154(b) by 743 days.

(21) Appl. No.: 10/986,849

(22) Filed: Nov. 15, 2004

(65) Prior Publication Data

US 2006/0106715 A1     May 18, 2006

(51) Int. Cl.
*G06Q 40/00*     (2006.01)
(52) U.S. Cl. ...................................................... 705/35
(58) Field of Classification Search .................... 705/30, 705/35, 36 R, 37; 707/100–104, 200; 902/37–41
See application file for complete search history.

(56) References Cited

U.S. PATENT DOCUMENTS 4,334,270 A * 6/1982 Towers ..................... 705/36 R

OTHER PUBLICATIONS

Lynn, et al., "Product Costing and Investments in Shared Technology", Jun. 19, 2000.*
HedgeSphere Press Release, pp. 1-5 (Oct. 20, 2004).
http://www.hedgesphere.com, "HedgeSphere: New Territory for Scalable Fund of Hedge Fund Management".
http://www.infonic.ch/infonic_200.shmtl, "HedgeSphere: New Territory for Fund of Hedge Fund Management", Infonic Information Engineering—HedgeSphere, pp. 1-2. {< Feb. 22, 2004}.

* cited by examiner

*Primary Examiner*—Mary Cheung
(74) *Attorney, Agent, or Firm*—Oliff & Berridge, PLC (57) ABSTRACT

Portfolio accounting systems and methods are adapted to handle uncertainty in accounting information due to time delay in information issuance. Accounting information is represented by streams of sequenced simple transaction states, each individual state describing the state of an account or its changes as known at a certain point in time while the stream ties the consecutive states into a life cycle of the information improving over time. A first simple transaction state attribute corresponds to the traditional value date. A second attribute corresponds to a reporting date. A third attribute corresponds to the traditional account value or relative/absolute changes thereof.

17 Claims, 10 Drawing Sheets

PORTFOLIO ACCOUNTING SYSTEM AND METHOD FOR HANDLING UNCERTAINTY IN ACCOUNTING INFORMATION

Related fields include portfolio accounting systems which are adapted to handle uncertainty in accounting information due to time delay in information issuance. Related fields include methods for handling uncertainty in accounting information.

BACKGROUND

Traditional portfolio accounting systems track account balances over time by using data pairs attributed to each account, each pair reflecting one of (a) the number of shares, (b) the share price or (c) a monetary value of an account plus the respective value date. This is sufficient for accounts where this information is confidently known at any single past and present value date. E.g. for a portfolio investing in stock exchange traded equity, the exact number of shares held of a given equity is known at any past and present point in time. Equally well known are one or a list of prices (e.g. offer, bid at one or multiple stock exchanges) of this share for each given past or present value date. The value of the portfolio position in our example for any given value date is derived by multiplying the number of shares held at this point in time (the value date) with the appropriate price known for this value date (one of the listed above or algorithmically derived of this list, maybe even in combination with some additional information like risk adjustment factors). However, an important example of where a traditional portfolio accounting system insufficiently models the business information and processes is the area of investments in alternative financial instruments, e.g. hedge funds or private equity. Final confirmed prices/values of these investments for a given value date, i.e. the price at which these investments are bought/sold, are only retrospectively known, e.g. 15 business days after their value date. On the other hand, estimate prices with a degree of fuzziness/uncertainty from different sources are often issued prior to the issuance date of the final price referring to the same value date. Many hedge funds are traded monthly, i.e. there is a trade/dealing date once a month at which investors can buy or sell shares of the fund. For this date, a final price at which investors can buy/sell is determined. The hedge fund manager may issue intermediate, e.g. weekly, prices or performance returns for his fund between the monthly final valuation dates. As he requires time to produce these intermediates, their issuance will typically, following the same time delay scheme as the monthly final trade prices, be a few days after the value date they are applicable for. For example, between the value date, say 30 January, and the issuance date of the final price, say 18 February, the hedge fund manager may issue one or two estimates of what the investment into the hedge fund was worth as of the value date 30 January. While the final value for 30 January is still outstanding, the hedge fund manager might on say 10 February issue an intermediate return for the period 30 January to 6 February. To determine the latest price of an investment into this hedge fund one has to apply this return on whatever latest estimate or final price is available for 30 January value date at the time of producing the portfolio (or investment position) value. I.e. the produced value of the investment position (and thus of the portfolio) at a given value date will depend on the time of production of this value.

A Fund of Hedge Funds (FoHF) manager runs one or multiple portfolios with each portfolio's assets invested into a number of hedge funds. The FoHF manager determines the value of his portfolio(s) by valuing its assets, i.e. investment positions and general ledger (cash, accruals, fx etc.). When buying/subscribing into or selling/redeeming investments into hedge funds, the FoHF manager places trades for a value date corresponding to a trade date of the underlying hedge fund. These trades may typically be fixed either by share or amount. From value/trade date up to confirmation of the final price by the hedge fund manager, these trades will reflect the change in the underlying price (either in their shares or in their value) as new estimates for the value date become available.

Handling this uncertain or fuzzy accounting information ultimately stemming from delayed issuance of confirmed (or final) pricing of the underlying alternative investments invested into is not possible with traditional portfolio accounting systems in a way that (a) balance sheets for a given value date and profit and loss statements for a given value period remain fully reproducible at whatever point in time these have originally been produced and may be published to investors or other parties (e.g. auditors) and (b) a full life cycle of any accounting information from first entry to final confirmation of both asset pricing and any other business transaction is fully accessible and (c) for (a) any view at a balance sheet for the same value date and any view at profit and loss statement for the same value period is both accessible and provided by the system in the same way and for (b) any information state over the price life cycle or other business transaction life cycle is both accessible and provided by the system in the same way.

SUMMARY

It is therefore beneficial to provide a portfolio accounting system and a corresponding method which allow to handle uncertainty in accounting information due to time delay in information issuance. It is beneficial to provide an accounting system and a corresponding method which allow to track transactions (including simple asset pricing information or more complex business transactions such as asset subscriptions or redemptions) whose values are at first only approximated and progressively get better until the final value is confirmed. It is a further beneficial to provide an accounting system and a corresponding method which allow to consistently reproduce accounting views (incl. individual account balances, individual transactions, balance sheets, i.e. portfolio valuations, profit and loss statements) produced at any given point in time at any given later point in time.

These benefits may be achieved by a portfolio accounting system and a corresponding method, wherein the accounting information is represented by streams of sequenced simple transaction states, which describe the state of an account or its changes, e.g. as known at a certain point in time. Each simple transaction state comprises next to an account reference at least three other attributes instead of two attributes with traditional accounting systems. A first attribute corresponds to the traditional value date, i.e. the date a pricing information refers to. A second attribute corresponds to a reporting date and establishes an additional time dimension which is not known with traditional accounting systems and will be discussed below. A third attribute corresponds to the traditional account value or relative/absolute changes thereof. Each stream links all consecutive simple transaction states representing views of the same business information as known to the system over time, thereby forming a "life cycle" of information. Herein, the term "date" for the additional (reporting) time dimension means date and/or time, e.g. 1 Jan. 2004, 4:30 pm.

The accounting system may allow for full tracking and navigation of any accounting information at individual level or within the context of a compound business transaction over its entire life cycle from first estimate to final confirmed value issuance as well as quick retrieval and complete reproducibility of any accounting view along both value date and information availability dimensions including their projection to traditional accounting system views, including balance sheets and profit and loss statements.

A simple transaction state may have further attributes, e.g. relating to the source of information, the degree of certainty/reliability and/or the person who entered the data into the system.

The reporting date is normally the date said value date and value parameter together with their account reference and optionally further attributes, i.e. the simple transaction state, are entered into the portfolio accounting system. This "normal" entry of updated information will also be referred to as "information update mode". In one implementation, the system provides for a mechanism to delegate control of this reporting date to the user or another system, e.g. for agreeing valuations with an outside entity in parallel to day-to-day data entry or for feeding of historic data. Usually however the accounting system is in a mode in which it automatically retrieves and saves said date, e.g. by internal server-side clock means. In the information update mode, the reporting date generally corresponds to the date accounting related information with potential fuzziness/uncertainty (e.g. estimated and/or confirmed pricing information or other business information) becomes available to the accounting system (i.e. is fed or entered into the system) or is deemed to have become known to the system.

Consecutive updates to the same information element (e.g. a price for a given asset and a given value date or a given asset subscription or redemption or in fact any other business transaction evolving over time) result in a "life cycle" of such business information, i.e. a stream or sequence of transaction states, also referred to as "information element". Each consecutive update operation to the same information element adds another state to its life cycle. The life span or validity of a state starts at its reporting date and ends at the reporting date of the subsequent state on the life cycle of the information element (if there is any subsequent state). Information update is generally used to track progressive quality of the same information as it is issued.

Herein, "information element" is used interchangeable with "transaction" for both simple and composite transactions (i.e. business transactions typically compound of multiple simple transactions), whereas a sequenced stream of states makes up an information element.

Next to information updating, the system also allows for information correction. The information correction operation supports (a) logical overwrite (i.e. replace) or (b) logical deletion of a transaction (information element) state. By such an operation the information element state being corrected will logically be "pushed aside" by appropriately marking the state. In case of an overwrite of an existing information element state in "information correction mode", additionally a new (i.e. replacement) state will be created adopting the reporting date of the underlying existing (i.e. replaced) state. Information correction is generally used to correct entry errors.

As a correction's purpose is to logically either overwrite (i.e. replace) or logically delete data, the original information by intention and design is not reproducible in any accounting views, while it still keeps being accessible in other parts of the system. On the other hand, for an information update the original information will still figure and be reproducible on any and all accounting views produced for (Note: not at) a reporting date falling in the life span of the original information state.

To further and more specifically for pricing illustrate the reporting date dimension (applying on any accounting information with potential time delay in issuance), pricing information, e.g. hedge fund price data (price per share, value and returns), is tracked on a two-dimensional area span by the value date and the reporting date (i.e. the date/time of when this information has become available) rather than just on a traditional one-dimensional value date axis. Thereby, the accountant gains the advantage of capturing all pricing information, optionally with further attributes, while providing for reproducibility of his information views for any value date and as of any reporting date plus backtracking of prices over their entire life cycle from first issuance to final confirmation (i.e. the various states on the stream of a specific price). If there are further attributes, it is also possible to generate "annotated" information views (or projections) that are only based on information having certain attributes, e.g. only taking into account confirmed pricing information.

Though some traditional accounting systems provide an audit trail, this is merely an aid to avoid physical deletion of information and allow for purely technical reconstruction. However, this audit trail does not add a fully functional, manageable logical "information availability" dimension to the accounting information model along which all information elements gain a life cycle in which each state (i.e. not only the latest) is made available and treated by the exact same logical and system mechanism both for entry/update and data retrieval (i.e. for information views). Moreover business information, both simple and compound may be fully accessed, navigated and backtracked over its entire life cycle.

In general, a traditional accounting system is unsuitable and should be replaced, if the following conditions are met:

Confirmed accounting information (i.e. final information with no fuzziness or uncertainty) for a certain value date is only available with time delay. Lower quality accounting information (i.e. estimate information with a degree of fuzziness/uncertainty) for this same value date may be available earlier (i.e. with no or less time delay).

The value of an accounting information element is required before final accounting information is available (i.e. based on best available information for a value date). This view has itself a quality assessed degree of uncertainty as it is based on accounting information with a degree of uncertainty.

This same accounting view must be consistently reproducible at later points in time, i.e. the accounting view for a given value date with best information as of a given "viewing" (or "production" or "reporting") date must be constructible at any point in time.

In the system, a simple transaction as conventionally known, e.g., the update of a balance of a certain account, is represented by a plurality (a "stream") of simple transaction states above the two-dimensional time plane, this stream forming the life cycle of the transaction information, i.e. how this same information was known of at different points in time (the states). For example, to reconstruct a view reflecting the knowledge of the accountant at an earlier point in time, the simple transaction states having a reporting date younger than this point in time are disregarded.

A business operation, e.g. a sale, is modelled by a set of simple transactions, i.e. one ore more, forming a "composite transaction" acting on one or more accounts and interconnected by certain predetermined business rules. A composite transaction therefore potentially comprises a plurality of streams of simple transaction states. As each simple transaction develops over time, described by its simple transaction states, there is a "composite transaction state" for each state of all the simple transactions forming the composite transaction.

In an implementation the accounting system further comprises means for checking whether a newly entered simple transaction state fulfils predetermined rules corresponding to transaction business rules. This is in particular applicable if the simple transaction state belongs to a "composite transaction state" as discussed above. As an alternative to a consistency check, there may also be means to automatically generate, or offer generation to the user, a simple transaction state referring to one account by calculating its attributes from one or more simple transaction states belonging to one or more other accounts, using the predetermined business rules.

In a further implementation, the accounting system further comprises means for providing a Balance sheet for one, a plurality or all of its accounts for a combination of any value date and any reporting date, by reflecting the state of all simple transactions referring to the corresponding accounts as of the given combination of value date and reporting date.

In a further implementation, the accounting system further comprises means for providing a Profit/Loss statement for one, a plurality or all of its accounts for any period between two value dates, with for each of these two value dates an individually selectable reporting date, by reflecting the transition of all simple transaction states referring to the same account between the two pairs of value date and reporting date.

In a further implementation, the accounting system further comprises means for providing at least one of the following operations of a traditional accounting system:
(a) correction of information element states for a given value date leading to intended non-reproducibility (except through use of the audit log) of the corrected original information in affected balance sheets and Profit/Loss statements;
(b) entry of unchecked accounting information only impacting accounting (e.g. Balances and P/Ls) if checked by a 2nd person.

The system may be implemented on a computer and/or a data communications network which provides the required resources like computing and storage capacity and user interfaces.

BRIEF DESCRIPTION OF THE DRAWINGS

FIG. 6A-C, 7A-C, 8A-C show examples of how certain regions in the two-dimensional time plane are potentially/actually influenced by transactions;

FIG. 9A-F show an example of an account balance after a series of write operations in a traditional accounting system;

FIG. 10A-F show the account balance based on the same operations as in FIG. 9A-F in an implementation of this accounting system;

FIG. 11 shows the life cycles of a composite transaction and of the initially two, then three simple transactions it is based on.

Figure 1:
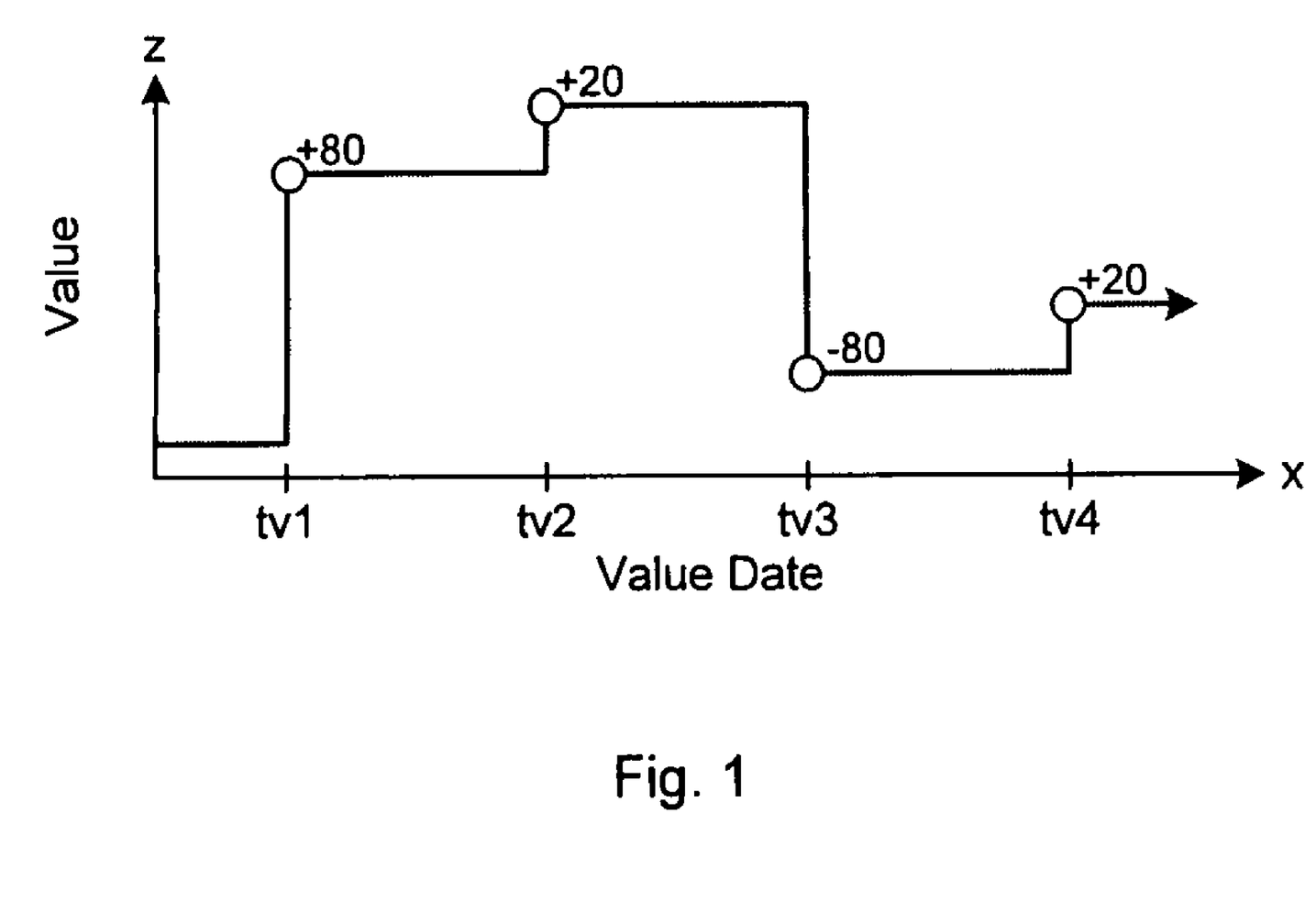
FIG. 1 shows schematically an account balance updated at several points in time by transactions in a traditional accounting system.

FIG. 1 shows the account balance ("value") in a traditional accounting system. A traditional accounting system tracks transactions and aggregates them to achieve a functional curve representing the value of the account for each point in time. The date on which the effective value of the transaction will be accounted for is called the value date. The aggregation function is called the account balance. In this example, the account balance is offset by +80 at value date tv1, by another +20 at value date tv2, by −80 at value date tv3 and by +20 at value date tv4.

When traditional accounting systems undergo data updates (not shown) the data previously entered will get discarded. Audit trails usually exist when the data's history needs to be reconstructed but manual intervention is needed.

Figure 2:
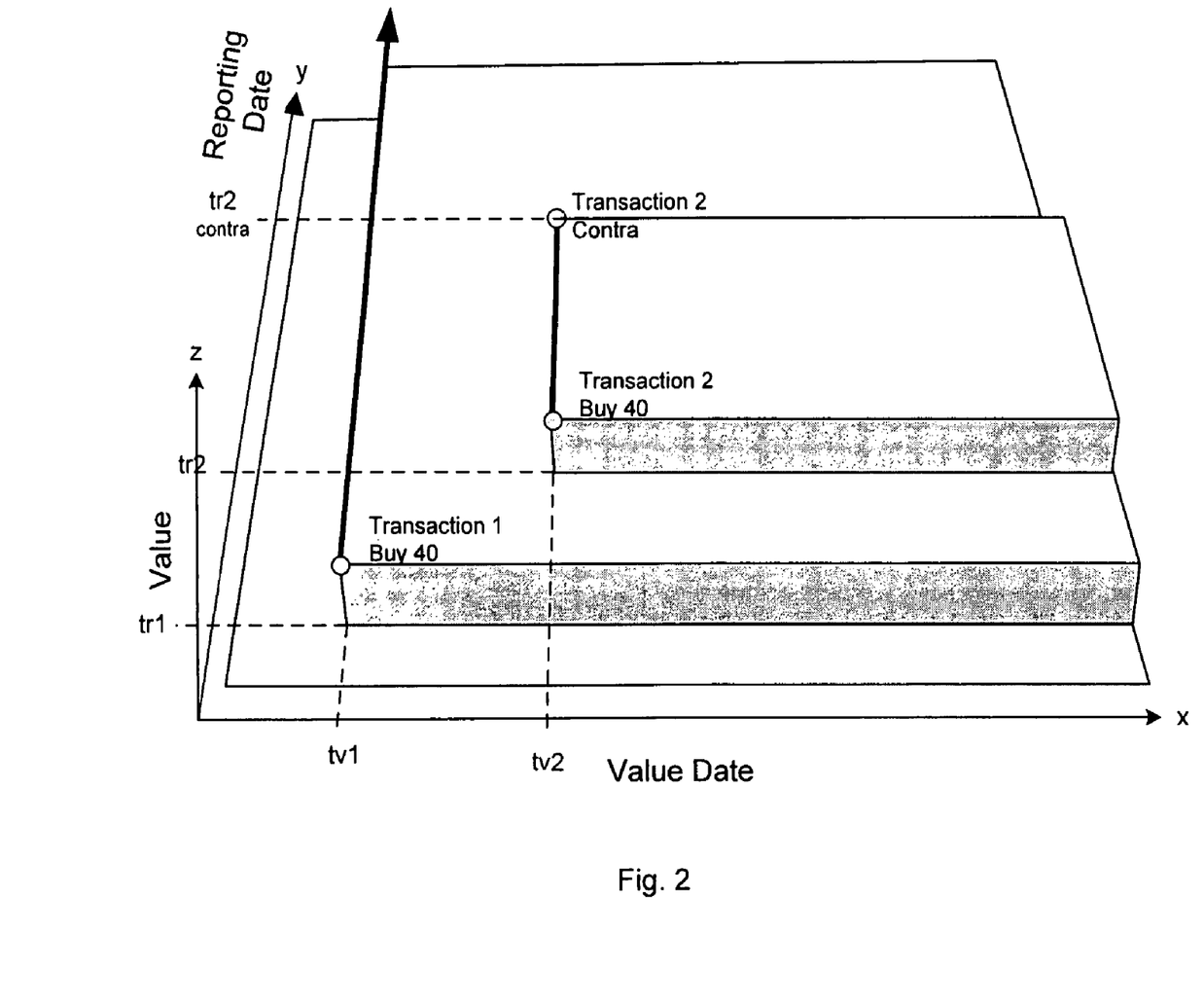
FIG. 2, 3 show schematically an account balance in an accounting system as a function of the value date and the reporting date.
Figure 3:
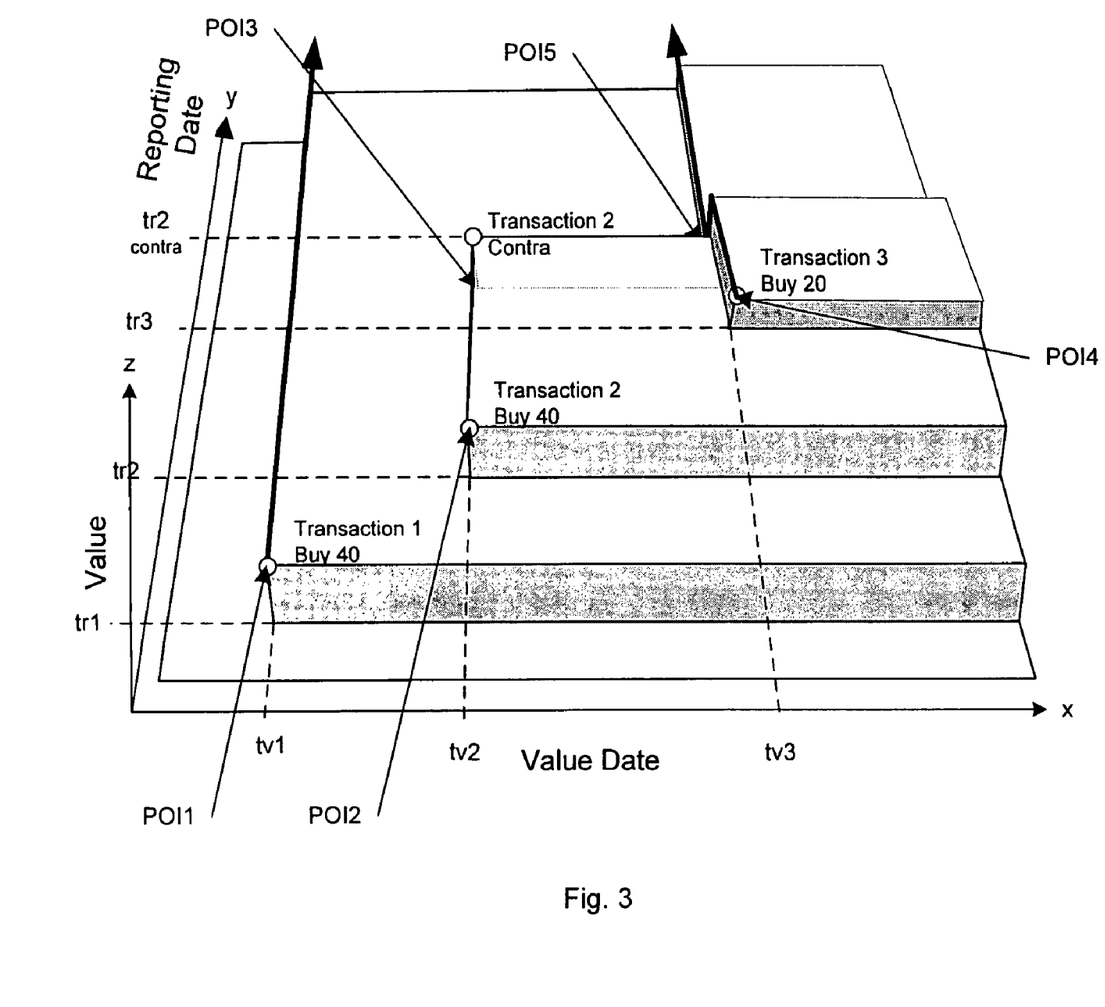

FIGS. 2 and 3 show the account balance (designated with "value", z-axis) in a 3D representation above a two-dimensional plane span by the value date (x-axis) and the reporting date (y-axis) at two different stages, i.e. before and after insertion of a third transaction. Please note that the value date (tv1, tv2, tv3) and reporting date (tr1, tr2, tr2-contra, tr3) coordinates of the respective transaction states are found by projecting the transaction states which are here indicated by circles onto the x-y-plane. For the sake of simplicity of the illustration, this projection has here been performed only partially for transaction 2 and 3, respectively not at all for the contra of transaction 2.

A first transaction, e.g. a buy of 40 shares, has a value date tv1 and has been entered in the accounting system at a reporting date tr1. Consequently, a first simple transaction state is generated in the system and offsets the account balance from 0 to 40 at x=tv1 and y=tr1 and for x≧tv1 and y≧tr1. A second transaction, e.g. another buy of 40 shares, has a value date tv2 and has been entered in the accounting system at a reporting date tr2. It offsets the account balance by another +40 at x=tv2 and y=tr2, resulting in an account balance of +80. The second transaction has been removed from the system at a later reporting date. This corresponds to the transaction having a date of expiry or contra date of tr2-contra. In the system, this corresponds to insertion of a new simple transaction state at x=tv2, y=tr2-contra having a value parameter corresponding to the inverse of the value parameter of the second simple transaction state (−40) and resulting in a reduction of the value by 40. The stream of the two simple transaction states at (tv2/tr2) and (tv2/tr2-contra) describes the development of the second transaction.

FIG. 3 shows the account balance after insertion of a third transaction, e.g. a buy of another 20 shares, having a value date tv3. The third transaction has been entered into the system at a reporting date tr3. The corresponding simple transaction state offsets the account balance by +20 at x=tv3, y=tr3 for any value date>tv3 and any reporting date>tr3. Note that because of the contraed second transaction, the account balance also changes at x=tv3, y=tr2-contra. If we assume that the original account balance for x<tv1 was zero, the account balance is 100 for x≧tv3 and tr2≦y<tr2-contra. Furthermore, the account balance is 100−40=60 for x≧tv3 and y≧tr2-contra.

The simple transaction states shown in FIGS. 2 and 3 all result in an increase or decrease of the account balance by a predetermined absolute value, which is determined by the value parameter. Such simple transaction states reflect a "relative transaction". It is also possible to describe the changes in the account balance by simple transaction states having a value parameter which indicates a relative increase/ decrease, e.g. given as a percentage of the actual account balance. Such simple transaction states reflect a "percentage transaction". A further possibility is that the transaction sets the value of the account to an absolute value ("anchorage transaction"). In this case, the value parameter of the simple transaction state reflects an absolute value of the account.

Since correction of past data is quite sporadic (but not uncommon) large parts of the account balance's surface will turn out to be redundant data. Storing only certain attributes of the surface is enough to keep the same information at hand while keeping the same level of performance as when all the values are stored.

By looking at the outcome of a transaction on the account balance's surface one can see that the surface with a value date≧tv(transaction x) and reporting date≧tr(transaction x) is offset by the transaction's value. Thus keeping track of the new value at the discrete point of the transaction is preferably the information which is stored to keep track of account balance without storing redundant information, as will be explained below in more detail.

We define the point with the smallest Value Date and smallest Reporting Date that represents the same value throughout the account balance as the "Point Of Influence" (POI). In this example, all simple transaction states at (tv1/tr1), (tv2/tr2), (tv2/tr2-contra) and (tv3/tr3) act as a POI (POI1, POI2, POI3, and POI4, respectively). Assuming again, that the account balance was originally zero, POI1 has a value of +40, POI2 has a value of 40+40=80, POI3 has a value of 80−40=40 (because of the contraed $2^{nd}$ transaction), and POI4 has a value of 80+20=100. Note that POI 3 lies on the surface of transaction 1 (corresponding to z=40) and is thus not visible in the 3D representation.

In addition, also a (hypothetical) simple transaction state at (tv3/tr2-contra) acts as a POI (designated with POI5). It has a value of 100−40=60, due to the contraed $2^{nd}$ transaction and influences the area with x≧tv3 and y≧tr2-contra. In general, the account balance at a time pair consisting of a reporting date belonging to a contraed transaction and a value date belonging to another transaction having a later value date than the contraed transaction acts as a POI.

At least the account balance belonging to POIs is stored in the system. This information is sufficient to fully define the whole account balance surface as shown in FIG. 2-4, though it is of course possible to store the account balance for any combination of value and reporting date with high redundancy.

The account balance itself is preferably determined by updating a value function upon or after entry of a new simple transaction state according to the value parameter of said simple transaction state. This is, starting from a known value, the value function is increased or decreased by a number or a percentage, if a relative or percentage transaction is involved, or set to the value parameter, if an anchorage transaction is involved. Updating a value function allows for quick update of the account balance and uses little system resources like storage capacity.

Another more complicated but also possible way to obtain the account balance for a requested pair (value date/reporting date) is to calculate for each request the account balance from simple transaction states having an earlier value and reporting date. In this case, one preferably starts in a first step with a first simple transaction state which value date is closest to the requested value date, which reporting date is smaller than the requested reporting date and which value parameter corresponds to an absolute account value (anchorage transaction). The value function is then set to the absolute value determined in the first step. If no anchorage transaction is found, it is set to zero. In a second step, it is determined if there are any other simple transaction states having a value date in the interval between the requested value date and that of the first simple transaction state and having a reporting date smaller than the requested reporting date. If this is the case, one knows that the value parameters of these simple transaction states then represent a change in the account balance rather than an absolute value thereof. Then, in a third step, the value function is changed, e.g. offset, in accordance with the value parameters of the simple transaction states determined in the second step.

Figure 4:
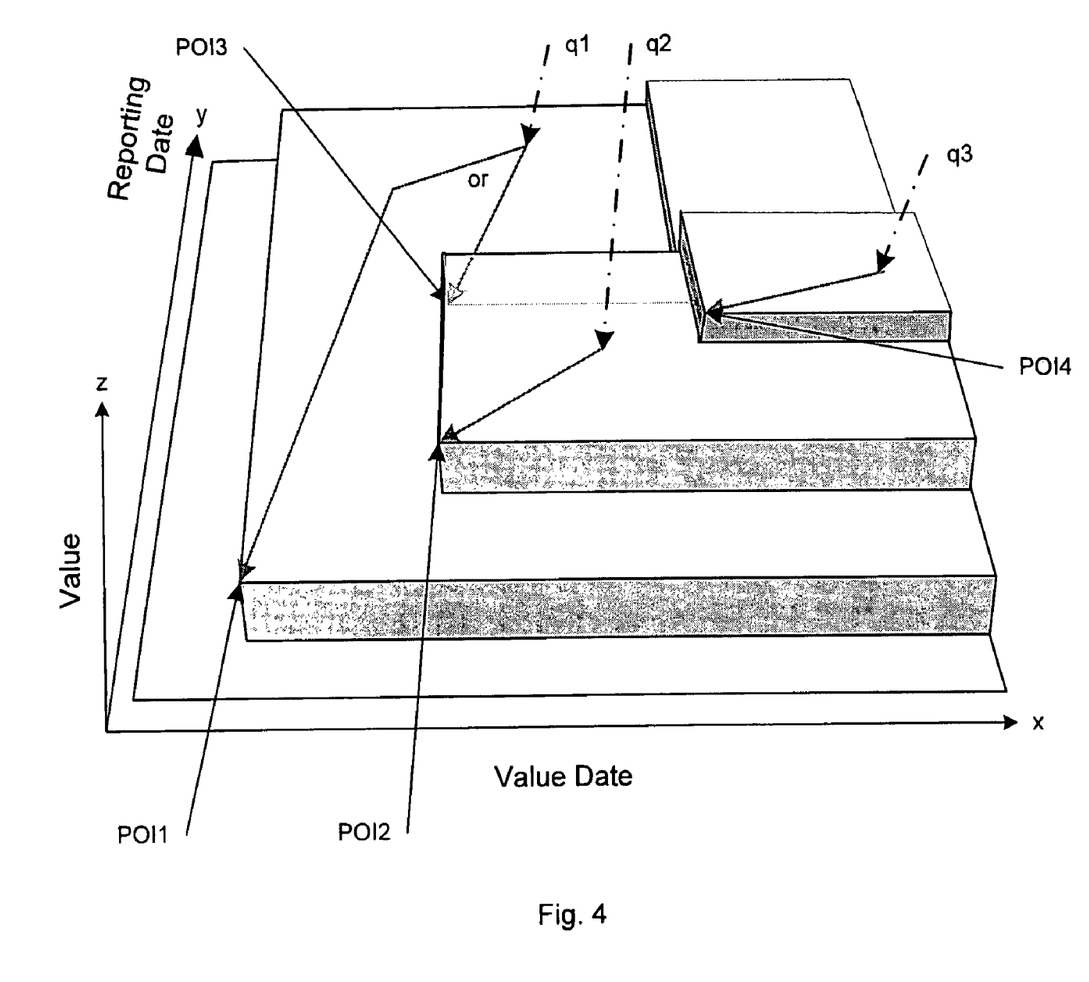
FIG. 4 shows schematically the valuation of the account shown in FIG. 3 for different pairs of value date and reporting date.

FIG. 4 shows schematically how the account balance for any pair of requested value date (reflecting the point in time for which the account balance is requested) and requested reporting date (reflecting the knowledge up to this reporting date) is retrieved from the account balance's surface. FIG. 4 shows an example for three queries q1, q2, q3.

Looking at the 3D representation of the double timed account balance, the value at any point on the surface can be found by searching for the Point Of Influence this surface originates from. This can be done by searching through all the Points Of Influence to find the POI having:

the maximum value date of all POI having a value date smaller than the requested value date;

the maximum reporting date of all POI having a reporting date smaller than the requested reporting date In this example, the left-most query q1 is located on the same plane as after the insertion of transaction 1 (value defined by POI1) or as the contra of transaction 2 (value defined by POI3). Both ways lead to the same result in value, i.e. 40. Query q2 can be reduced to POI2 (value=80), and query q3 to POI4 (value=100).

A transformation of the system's account balance into a traditional accounting view is a projection eliminating the reporting date dimension. This can be obtained by either calling the algorithm described with reference to FIG. 4 for all the possible Value Dates or by applying the following algorithm:

(Step 1) Group all the Points Of Influence by their Value Date. (Step 2) Select for each group the Point Of Influence with the maximal Reporting Date. This selection is the subset of Points Of Influence that are needed to get the projection based on the latest available information.

Figure 5:
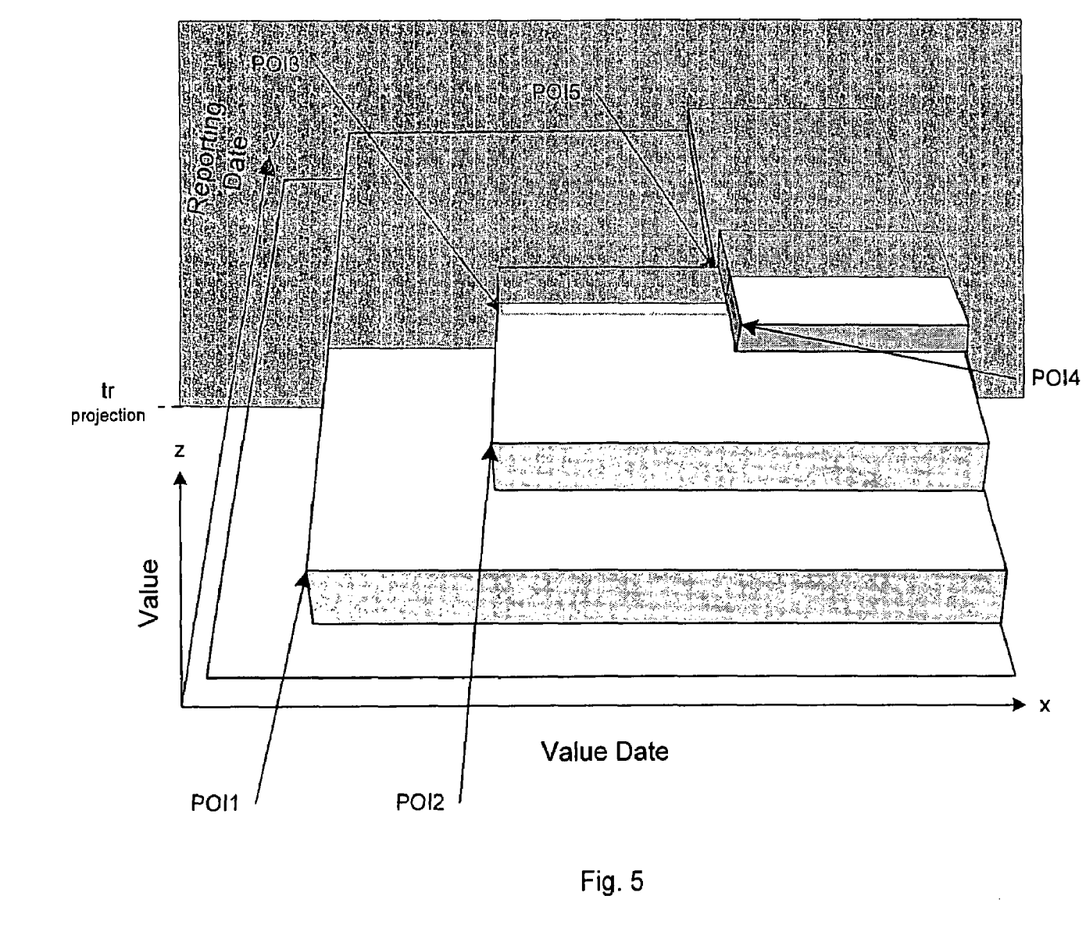
FIG. 5 shows how an account balance depending only on the value date for a specific reporting date can be obtained.

One can also find the projection, as it would have been in the past by specifying a past "time-of-view", which includes all knowledge up to a given reporting date tr-projection, but no later added information. That projection can be obtained by adding a step between Step 1 and Step 2 of the above algorithm that removes all Points Of Influence that have a Reporting Date greater than tr-projection. This is schematically shown in FIG. 5, where only POI1, POI2 and POI4 are "active" and POI3 and POI5 are disregarded.

In a further implementation, an "annotated projection" of the account balance represents the information of which person last modified the account balance on each value date or which level of reliability the information has. An example is shown in the following table:

| ValueDate | Value | Person responsible for Value Change |
|---|---|---|
| 01-Jan-2004 | 10'000'000 | Thomas |
| 15-Jan-2004 | 12'000'000 | Thomas |
| 22-Jan-2004 | 11'500'000 | John |
| 30-Jan-2004 | 22'500'000 | Thomas |

As discussed above, information retrieval in the accounting system is a quite fast and thereby inexpensive operation. On the other hand, write or update operations for a given pair (tv/tr) are more complicated operations which require more system resources, as they potentially affect the whole 2-dimensional space with value date$\geq$tv and reporting date$\geq$tr. Performance can still be kept high by queuing the write operations and postponing their effective operation for a later time when system resources are idle. Another thing to keep in mind is the fact that the write operations are associative. If a write operation follows another write operation, then the order of execution can be interchanged if needed. This would allow a query operation, dependant of a write operation done very recently, to run earlier due to the fact that the depending write operation could be executed as the very first operation.

In the following, the main ideas of updating the account balance in the 2D time space will be described along with a fast way of updating it with reference to FIGS. 6A-C, 7A-C, 8A-C.

Each simple transaction state with a given data pair (tv/tr) has a domain of influence on the account balance, which is generally made up from all points having a value date$\geq$tv and a reporting date$\geq$tr, but may be additionally limited by other simple transaction states. The "Potential Domain of Influence" and the "Correct Domain of Influence" are described in this section.

Figure 6A:
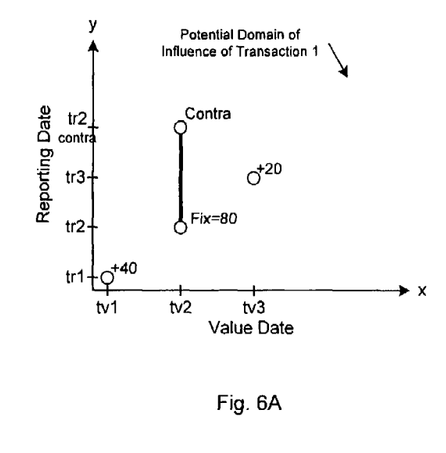
Figure 6B:
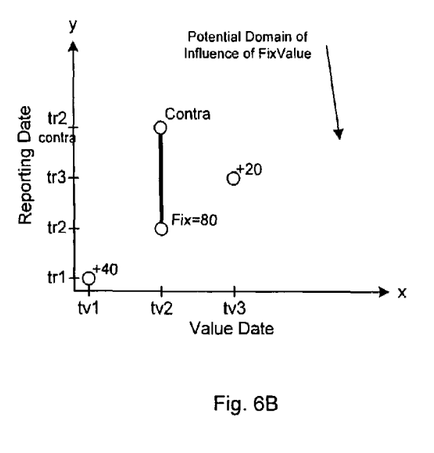
Figure 6C:
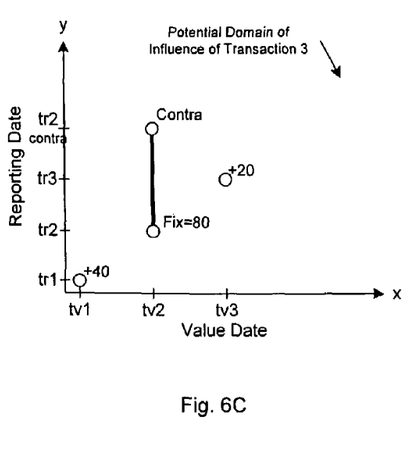

When a write operation (entry of a new simple transaction state) is effected on the account balance it potentially offsets an infinitely large surface from the transaction's Point Of Influence as shown in FIG. 6A-C. FIG. 6A illustrates the potential domain of influence of the first transaction which results in the entry of a simple transaction state at x=tv1, y=tr1 with a value parameter of +40 (relative transaction, see also FIG. 2). The shaded surface with x$\geq$tv1 and y$\geq$tr1 is called the Potential Domain of Influence of the first transaction. FIG. 6B shows the domain of influence for the second transaction from FIG. 2 (here shown as an anchorage transaction with the fixed value parameter 80). Since it has been contraed at y=tr2-contra, the domain of influence is restricted in the reporting date dimension by the contra date tr2-contra, but is infinite in the value date dimension for x$\geq$tv2. FIG. 6C shows the potential domain of influence for the third transaction (also illustrated in FIG. 3), which is again infinite for x$\geq$tv3 and y$\geq$tr3.

Figure 7A:
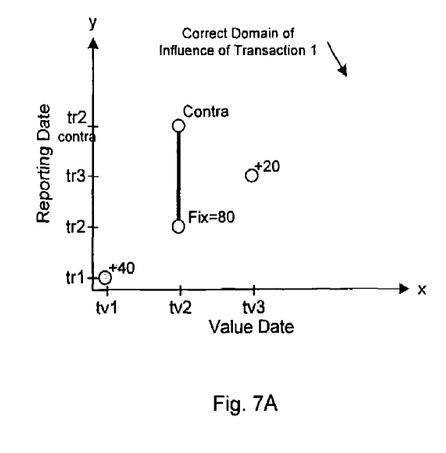
Figure 7B:
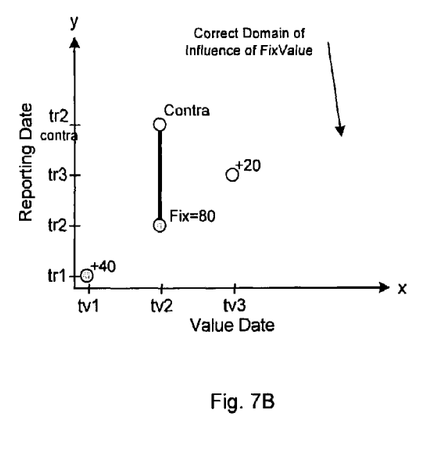
Figure 7C:
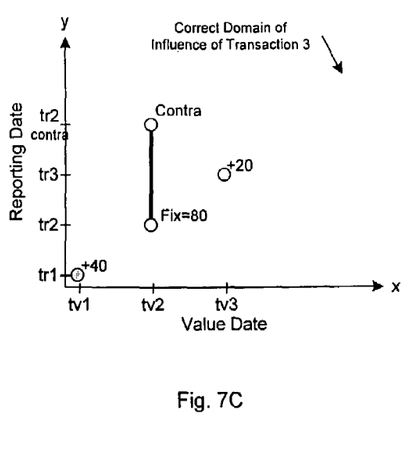

Anchorage Transactions set the account balance to a fixed absolute value. If these transactions are located within the Potential Domain of Influence of another simple transaction state, they will not be influenced because of the nature of this anchor. The Correct Domain of Influence is thus defined as the Potential Domain of Influence excluding all the Potential Domains of Influence of all the Anchorage Transactions inside it. If no Anchorage Transactions are located in the Potential Domain of Influence then it is equivalent to the Correct Domain of Influence. This is depicted in FIG. 7A-C showing the correct domains of influence of the first, second and third transaction already shown in FIG. 6A-C. The Correct Domain of Influence is the same as the Potential one for FIGS. 7B and 7C. The first transaction, however, cannot override values inside the domain set by the second (Anchorage) Transaction, as shown in FIG. 7A.

Geometrically speaking, if a write operation occurs on the account balance, then the surface, defined by the transaction's Point Of Influence, is elevated/lowered by a known height. This might cause certain surfaces defined by other Points Of Influence to be divided into two pieces. As discussed above with reference to FIG. 3, this will be correctly described by inserting further Points Of Influence, which do not directly reflect a simple transaction state but serve as a theoretical means to reflect the newly created surfaces and allow queries to operate correctly. An example thereof is POI5 in FIG. 3.

Figure 8A:
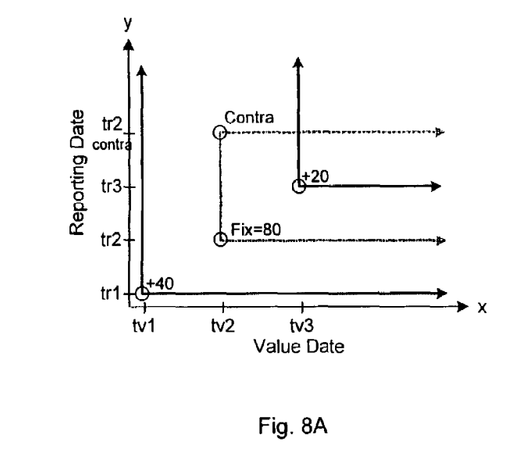
Figure 8B:
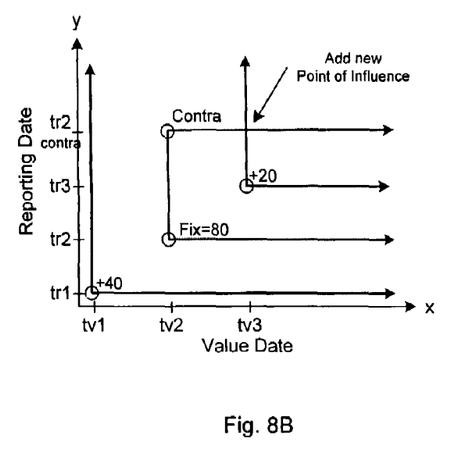
Figure 8C:
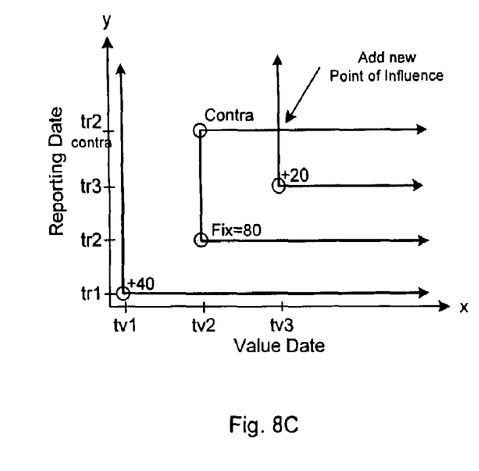
Figure 9A:
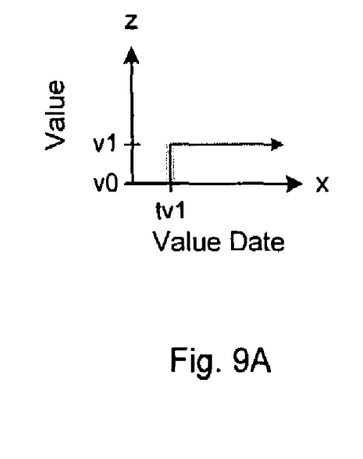
Figure 9B:
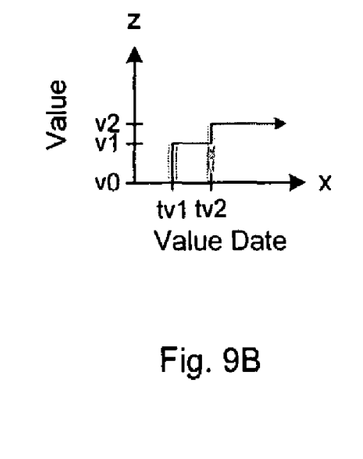
Figure 9C:
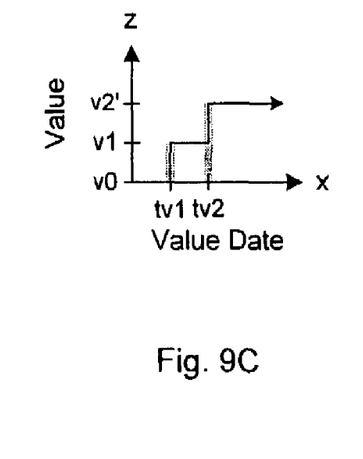
Figure 9D:
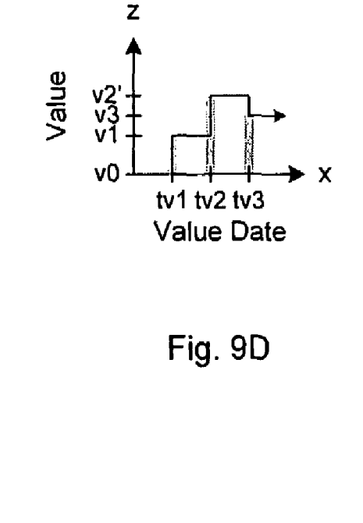
Figure 9E:
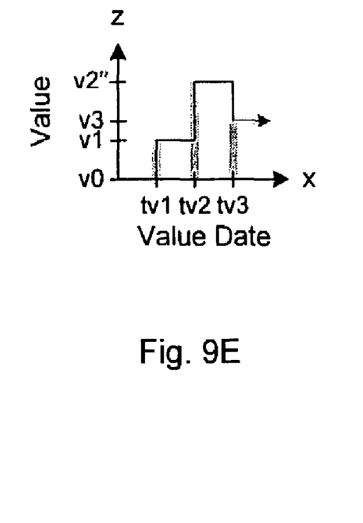
Figure 9F:
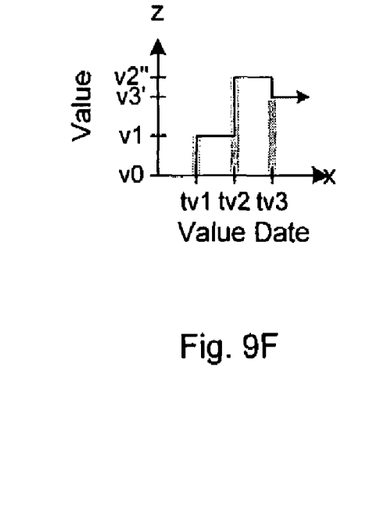
Figure 10A:
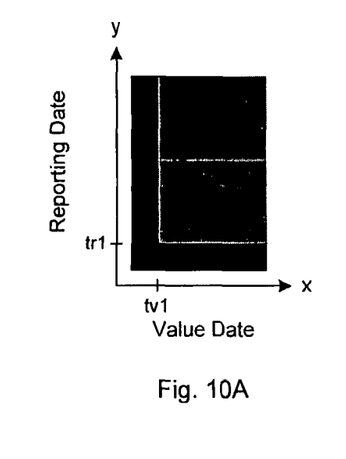
Figure 10B:
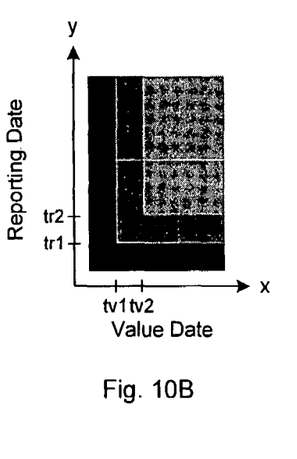
Figure 10C:
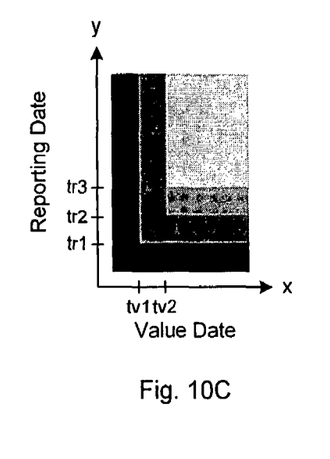
Figure 10D:
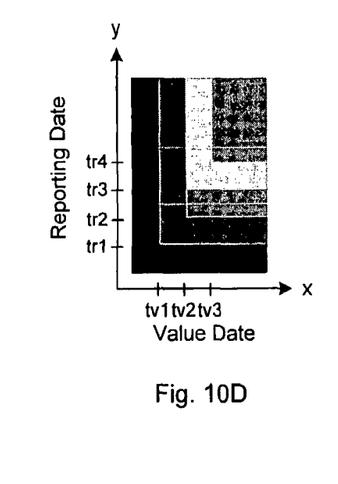
Figure 10E:
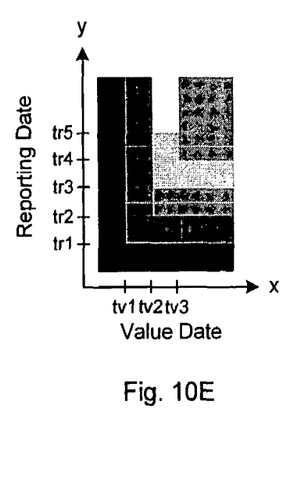
Figure 10F:
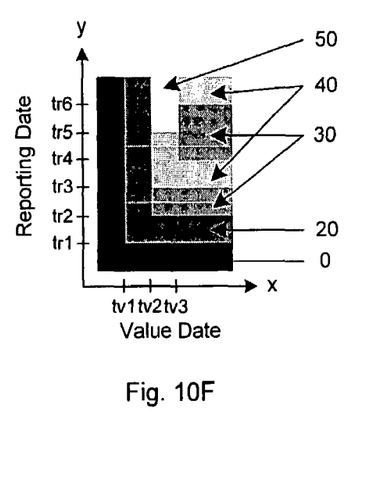

FIG. 8A-C illustrate how to find these additional POI when adding the first, second and third transaction, respectively. Generally, the intersections of the borderlines of the transaction's/write operation's Potential Domain of Influence and the borderlines of the Points Of Influence already defining the account balance have to be determined. In FIG. 8A, referring to the first transaction, there are no such intersections, thus no additional POI. In FIGS. 8B and 8C, there are intersections resulting in the creation of POI 5 at x=tv3 and y=tr2-contra. These additional POI need to be inserted before the actual operation is executed. The trivial Point Of Influence that also needs to be inserted is the one the write operation is occurring on.

For relative value changes, defined by relative or percentage transactions, once the missing Points Of Influence have been inserted, the values of all the Points Of Influence found within the boundary of the Correct Domain of Influence are increased/decreased by the relative amount stated in the transaction.

Absolute value changes are best executed as a relative value change (as shown above) from the value found at the Anchorage Transaction's Value Date/Reporting Date (prior to the update) using the algorithm described with respect to FIG. 4 and the value stated in the Anchorage Transaction itself.

The following example will do the following six steps:
1) Insert a value of v1=20 for the value date tv1=$1^{st}$ of January, the insertion done at reporting date tr1
2) Insert a value of v2=30 for the value date tv2=$1^{st}$ of February (reporting date tr2)
3) Change the value for the $1^{st}$ of February from v2=30 to v2'=40 (reporting date tr3)
4) Insert a value of v3=30 for the value date tv3=$1^{st}$ of March (reporting date tr4)
5) Change the value for the $1^{st}$ of February from v2'=40 to v2"=50 (reporting date tr5)
6) Change the value for the $1^{st}$ of March from v3=30 to v3'=40 (reporting date tr6)

FIG. 9A-F shows the six account balances after each of the six steps (top to bottom, left to right) in a traditional accounting system. Construction of views from an earlier point of view (reporting date) is not possible.

FIG. 10A-F shows the same six steps using an implementation of this accounting system. The account balance is represented by different grey shades, where black represents the zero value, white the value 50 and the other grey shades the intermediate values 20, 30 and 40 (see FIG. 10F). The account balance for any requested pair of value date and reporting date can be retrieved quickly and by economically using the system resources like storage and computing capacity, especially by retrieving the z-value of the plane a given query belongs to, as described above.

The accounting system can be implemented on essentially any information management platform, including relational database platform (MS SQL Server, Oracle, DB2, . . . ) and in any programming language supporting any array or list construct (PL/SQL, Transact-SQL, Java, C, C++, . . . ). By implementing the system on one or more computers, means for entering said value parameter, value date and account reference, means for entering or generating said reporting date and means for storing an simple transaction state comprising said value parameter, value date, reporting date and account reference and respective storage means are automatically provided.

Figure 11:
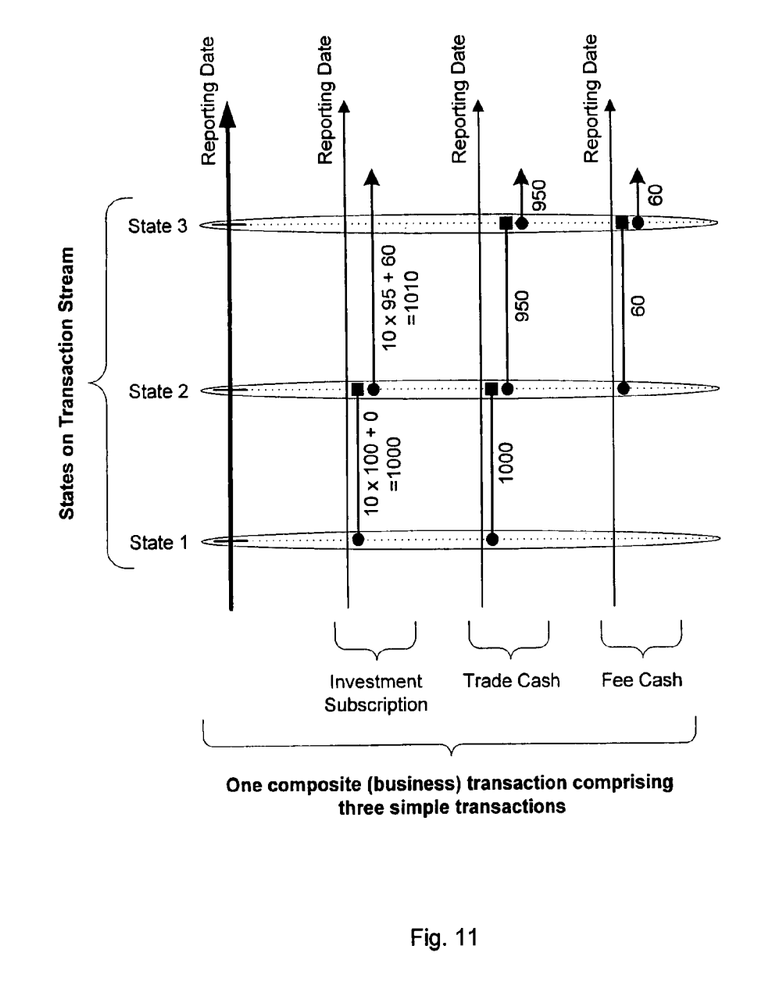

FIG. 11 shows the life cycles of a sample composite transaction and of the initially two, then three simple transactions it is comprised of by showing the temporal development (i.e. life cycle) or "stream" of the corresponding transaction states both at simple and composite transaction level. More specifically, an investment being traded with cash is shown by showing the development of the investment (subscription) transaction, and the two involved cash transactions and the resulting (composite) business transaction depending on the reporting date. The three vertical arrows on the right-hand side show how the investment transaction and the two cash transactions, from left to right, come to life and develop depending on the reporting date. The left-hand side arrow shows the development of the composite transaction. The arrows thus represent the simple/composite transactions or streams in their evolution over time, the filled circles represent the simple transaction states of the investment and cash transactions, the squares represent the expiry of such a simple transaction state (due to entry of an updated one), and the horizontal dotted lines represent a composite transaction state.

The investment was originally bought as ten shares at a price of 100. This is indicated with "state 1", belonging to a first reporting date. At this point the investment transaction (i.e. the shares) was traded with a single cash transaction. At a later reporting date, as indicated by "state 2", the investment was, due to a final (lower) share price issued for the transaction value date, changed to ten shares at a price of 95 plus a transaction fee of 60. As for our illustration a decision has been taken to book fees through a separate cash transaction, not only is the amount of the original cash transaction at "state 2" been updated to 950 to reflect the change in share price, but at the same time (i.e. "state 2") a second cash transaction to pay the fee comes into existence. At an even later reporting date ("state 3"), both cash transaction were settled. This settlement information is an example of additional attributes in simple transaction states, here for simple transactions (i.e. their states) reflecting cash movements.

The system thus generates for each simple transaction state of the simple transactions (here: investment and cash transactions) a composite transaction state or business operation state of the corresponding composite transaction. In this example, even though the investment transaction at time of cash settlement ("state 3") does not undergo a change and thus requires no simple transaction state, the business transaction has at state at all three reporting dates, as indicated by the horizontal dotted lines.

A business operation generally has a certain number of business rules that keep the business operation (as well as the individual simple transactions) consistent in each of its states as well as over the sequencing of its states. A possible rule governing each composite transaction state for the above example is that the value of the investment and the value of all cash amounts must always match. Preferably, the system must validate the business transaction and its simple transactions against these business rules for each state and the sequencing thereof. The system must also support the information update and correction operations in a consistent way in order to preserve integrity and allow for state retrieval and state (or life cycle) navigation as well as support the required accounting information views.

The invention claimed is:

1. A method for handling uncertainty in accounting information due to time delay in information issuance comprising:
representing the accounting information by streams of sequenced simple transaction states, each simple transaction state comprising at least four attributes, among which:
a first attribute corresponds to a value date,
a second attribute corresponds to a reporting date,
a third attribute corresponds to a value parameter, and
a fourth attribute is an account reference, said value date being a date said value parameter refers to and said reporting date being a date or a time said value date and said value parameter together with their account reference are entered into or are deemed to have become known to a portfolio accounting system, while each stream links all consecutive simple transaction states representing views of the same accounting information as known to the system over time; and
entering a corrective simple transaction state in an information correction mode;
wherein a reporting date of the corrective simple transaction state corresponds to a reporting date of an original, corrected simple transaction state, and the portfolio accounting system is implemented by a computer executing a computer-executable program stored on a computer-readable medium.

2. The method according to claim 1, further comprising entering a simple transaction state into an accounting system when new accounting information occurs, and storing said simple transaction state.

3. A method for handling uncertainty in accounting information due to time delay in information issuance comprising:
representing the accounting information by streams of sequenced simple transaction states, each simple transaction state comprising at least four attributes, among which:
a first attribute corresponds to a value date,
a second attribute corresponds to a reporting date,
a third attribute corresponds to a value parameter, and
a fourth attribute is an account reference, said value date being a date said value parameter refers to and said reporting date being a date or a time said value date and said value parameter together with their account reference are entered into or are deemed to have become known to a portfolio accounting system, while each stream links all consecutive simple transaction states representing views of the same accounting information as known to the system over time; and
determining an absolute value of a predetermined account for a requested value date by considering simple transaction states having a reporting date smaller than or equal a requested reporting date;
wherein the portfolio accounting system is implemented by a computer executing a computer-executable program stored on a computer-readable medium.

4. The method according to claim 3, further comprising automatically retrieving the reporting date from a central clock or entering the reporting date entered by a user or supplied by another system, such that, in an information update mode, the reporting date corresponds to an actual date or an actual time of entry of the simple transaction state into the accounting system.

5. The method according to claim 3, wherein said step of determining the absolute value of the predetermined account comprises changing a value function upon or after entry of a simple transaction state which account reference refers to the predetermined account according to the value parameter of said simple transaction state.

6. The method according to claim 5, further comprising storing said value function as a function of the value date and the reporting date.

7. The method according to claim 5, further comprising providing for at least one account a consistent multi-period Profit/Loss statement for any sequence of consecutive sub-periods between two value dates, with each sub-period having a reporting date for both a starting value date and an ending value date, with the reporting date for the starting value date of one sub-period being equal to the reporting date for the ending value date of a preceding sub-period.

8. The method according to claim 3, further comprising providing for at least one account a Balance Sheet for a given combination of any value date and reporting date, by reflecting a state of all simple transactions referring to corresponding accounts as of the given combination of the value date and reporting date.

9. The method according to claim 3, further comprising providing for at least one account a Profit and Loss statement for any period between two value dates, each of the value dates being paired with an individually selectable reporting date, by reflecting a transition of all simple transaction states referring to a same account between the two pairs of value dates and reporting dates.

10. The method according to claim 3, further comprising providing at least one of the following operations of a traditional accounting system:
  (a) correction of accounting data item states for a given value date leading to changing balances and Profit/Loss statements; and
  (b) entry of unchecked accounting information only impacting accounting if checked by a second person.

11. The method according to claim 3, further comprising checking whether a simple transaction state fulfils predetermined rules corresponding to transaction business rules.

12. A method for handling uncertainty in accounting information due to time delay in information issuance comprising:
  representing the accounting information by streams of sequenced simple transaction states, each simple transaction state comprising at least four attributes, among which:
    a first attribute corresponds to a value date,
    a second attribute corresponds to a reporting date,
    a third attribute corresponds to a value parameter, and
    a fourth attribute is an account reference, said value date being a date said value parameter refers to and said reporting date being a date or a time said value date and said value parameter together with their account reference are entered into or are deemed to have become known to a portfolio accounting system, while each stream links all consecutive simple transaction states representing views of the same accounting information as known to the system over time; and
  grouping one or a multitude of simple transactions in a composite transaction affecting one or a multitude of accounts;
  wherein the portfolio accounting system is implemented by a computer executing a computer-executable program stored on a computer-readable medium.

13. The method according to claim 12, further comprising generating a composite transaction state for each state of all of the simple transaction states grouped under said composite transaction.

14. The method according to claim 13, further comprising checking whether said composite transaction state or a state sequencing fulfills predetermined rules corresponding to transaction business rules.

15. The method according to claim 12, comprising defining and hard or soft enforcing business rules governing consistency of transactions regarding individual states or state sequencing, both at a simple and a composite transaction level.

16. The method according to claim 12, further comprising consistently managing and tracking the streams of simple transaction states both at a simple and a composite transaction level for both information update and information correction operations.

17. The method according to claim 12, further comprising making fully available the streams of simple transaction states, both on a simple and a composite transaction level at any time both for retrieval, navigation along the state sequence and entry/update, wherein all transaction states are available and treated equally both for the retrieval and the entry/update.

* * * * *